United States Patent [19]
Lotito et al.

[11] Patent Number: 5,988,676
[45] Date of Patent: Nov. 23, 1999

[54] OPTICAL WEIGHT SENSOR FOR VEHICULAR SAFETY RESTRAINT SYSTEMS

[75] Inventors: James C. Lotito, Warren; Ronald A. Marker, deceased, late of Sterling Heights, by Aloysine Marker, legal representative; Matthew W. Owen, Harper Woods, all of Mich.

[73] Assignee: Breed Automotive Technology, Inc., Lakeland, Fla.

[21] Appl. No.: 08/942,227

[22] Filed: Oct. 1, 1997

[51] Int. Cl.⁶ ............................................. B60R 21/32
[52] U.S. Cl. ................... 280/735; 280/735; 359/196; 359/291; 180/273; 33/707
[58] Field of Search ........................... 280/735; 359/196, 359/291; 180/273; 33/707

[56] References Cited

U.S. PATENT DOCUMENTS

| | | | |
|---|---|---|---|
| 5,446,661 | 8/1995 | Gioutsos et al. | 280/735 X |
| 5,598,268 | 1/1997 | Kellner | 356/375 |
| 5,709,404 | 1/1998 | Brooks | 280/735 |
| 5,785,347 | 7/1998 | Adolph et al. | 280/735 |
| 5,871,232 | 2/1999 | White | 280/735 |

OTHER PUBLICATIONS

"Sensing Automobile Occupant Position with Optical Triangulation" by Walt Chapelle and Ed Gillis, pp. 18–22, Sensors, Dec. 1995.

*Primary Examiner*—Christopher P. Ellis
*Attorney, Agent, or Firm*—Markell Seitzman

[57] ABSTRACT

An optical weight sensor (16) for use in the crash management system of a motor vehicle's safety restraint system (10). The optical weight sensor (16) functions to determine the weight of an occupant sitting on a vehicle seat (12) and is mounted between the seat frame (42) and mounting structure (46) of the vehicle seat (12). The optical weight sensor (16) includes an imaging assembly (52) retained in an enclosed housing assembly (50). The weight of a seat occupant causes a portion (56) of the housing assembly (50) to deflect the imaging assembly (52) generating a change in a reflection angle caused by such deflection. The imaging assembly (52) includes a light emitting unit (70) which emits a light beam onto a target area (78) on housing portion (56) which is subsequently reflected onto a position sensing unit (76).

13 Claims, 5 Drawing Sheets

OPTICAL WEIGHT SENSOR FOR VEHICULAR SAFETY RESTRAINT SYSTEMS

BACKGROUND OF THE INVENTION

1. Technical Field

The present invention relates to a safety restraint system for use in motor vehicles. In particular, the present invention is directed to an optical weight sensor for generating a signal indicative of the weight of a person or object seated or located in a vehicle seat.

2. Discussion

Safety restraint systems are used in motor vehicles for protecting the vehicle occupants during collisions. In addition to seat belts, many safety restraint systems now include a driver-side airbag mounted in the steering wheel and a passenger-side airbag mounted in the dashboard. Furthermore, recent attention has been directed to incorporation of other restraint devices such as, for example, side airbags, seat belt pretensioners, and energy management retractors into the safety restraint system. Many, if not all, of these restraint devices are activated by the vehicle's crash management system in response to detection of a vehicular collision exceeding a predetermined impact magnitude.

In order to optimize occupant protection during a collision, it is desirable to vary the deployment characteristics of the airbags and/or the operational characteristic of the other restraint devices based on various control parameters such as, for example, the severity of the crash, belt usage, and the position and size of the seat occupant. Thus, the vehicle's crash management system includes various sensors for detecting and/or measuring such control parameters. One particular control parameter that is useful for regulating the output characteristics of the restraint devices is the weight of the seat occupant. As such, a need exists to develop a weight sensing device for use in safety restraint systems.

SUMMARY OF THE INVENTION

Accordingly, the present invention is directed to a weight measuring device for incorporation into the crash management system of a motor vehicle's safety restraint system. This objective may be achieved by providing an optical weight sensor which is sensitive to the magnitude of a displacement of a sensor part caused by an occupant sitting in a vehicle seat and which is indicative of the occupant's weight.

In accordance with the teachings of the present invention, an optical weight sensor is provided for measuring the weight of a seat occupant. The optical weight sensor is mounted between the seat frame and the seat mounting structure or between the seat mounting structure and the vehicle floor or within the seat cushion. In one embodiment of the invention the optical weight sensor is comprised of an enclosed housing assembly and an imaging assembly mounted within the housing assembly. In another embodiment of the invention the optical weight sensor is comprised of a light reflecting assembly. In operation, the weight of the seat occupant deflects a flexible portion of the housing assembly. The imaging assembly focuses an image of a light beam pattern located on a target area of the flexible portion onto a position sensing unit. As the flexible portion deflects in response the weight of the object or occupant the size or position of the image on the position sensing unit changes generating a varying electric output signal. Upon calibration of the system this positional variation provides an indication of the weight of the occupant or object. As can be appreciated, the weight sensor, and associated electronics, can also provide an indication that no object or occupant is located in the seat. In the second embodiment of the invention a light beam is directly reflected off of the target area of the sensor and onto a position sensing unit. The varying location and or size of the reflected light beam on the position sensing unit will provide a variable signal indicative of the weight of the object or occupant. As can be seen, the position sensing unit generates an output signal which is proportional to the amount of deflection which, in turn, is indicative of the occupant's weight.

A method is also disclosed for measuring the weight of a seat occupant. The method includes the steps of projecting a beam of light toward a target area, displacing the target area in proportion to the weight of an object, and measuring the displacement of the target area by determining the reflection angle of the reflected beam of light. An output signal indicative of the occupant's weight will be generated in proportion to the measured displacement.

DETAILED DESCRIPTION OF THE PREFERRED EMBODIMENTS

In general, the present invention is directed to a safety restraint system for a motor vehicle having a crash management system operable for adaptively regulating the output of one or more restraint devices in response to various input signals. More particularly, an optical weight sensor is disclosed which is applicable for use in otherwise conventional crash management systems for providing a sensor input signal to the controller indicative of the occupant's weight. Thus, while the optical weight sensor of the present invention is shown incorporated into a particular safety restraint system, such is merely exemplary of but one safety restraint system to which the optical weight sensor can be incorporated.

Figure 1:
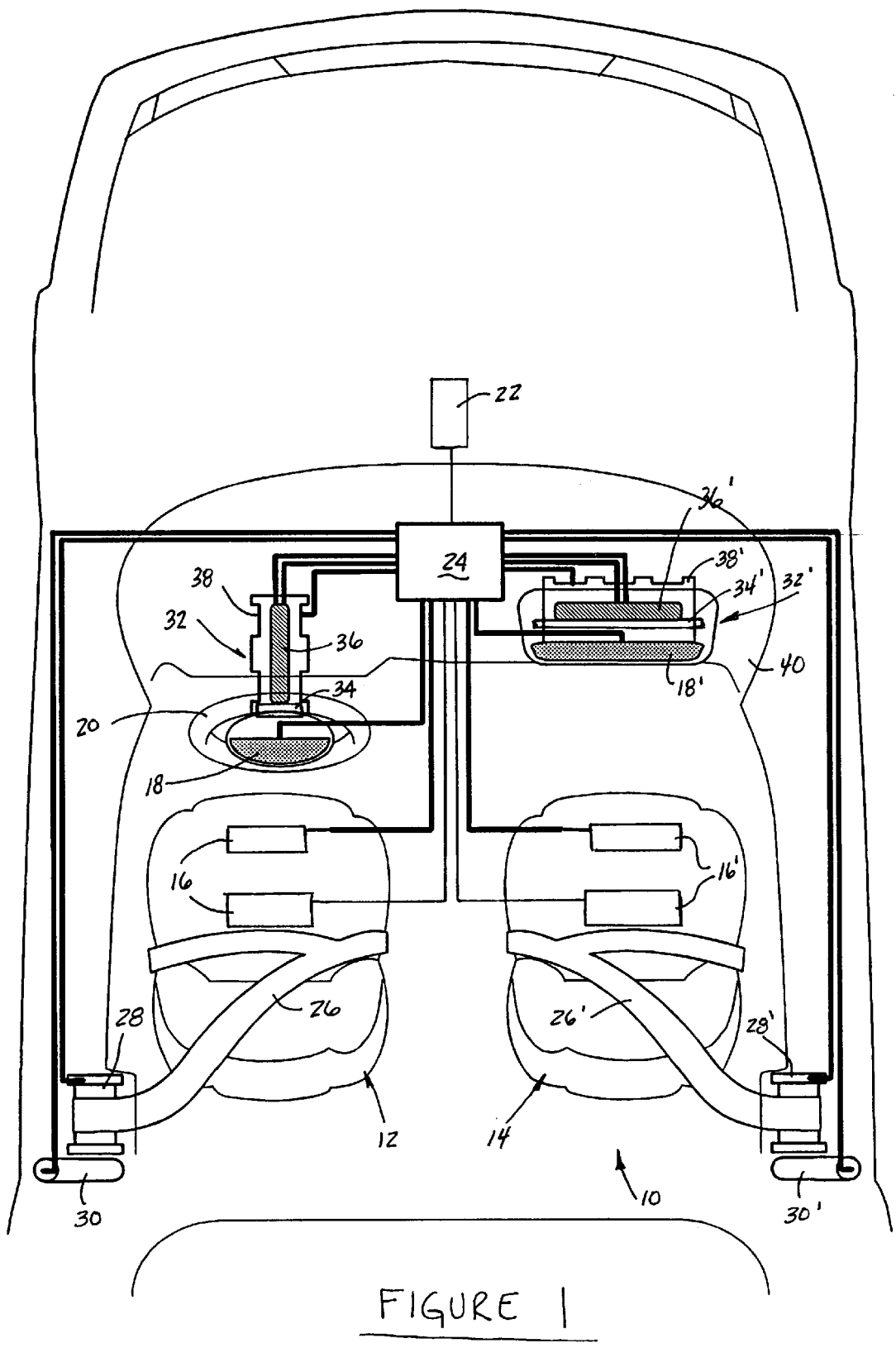
FIG. 1 is a top environmental view of the interior of a motor vehicle showing the optical weight sensor of the present invention incorporated into an exemplary safety restraint system.

Referring now to FIG. 1, a safety restraint system 10 for a motor vehicle is shown in association with a driver-side seat 12 and a passenger-side seat 14. Safety restraint system 10 includes a crash management system which functions to detect various crash severity and occupant position characteristics and controls activation of several restraint devices in response thereto. In association with driver seat 12, the crash management system is shown to include a pair of optical weight sensors 16, an occupant proximity sensor 18 mounted in a steering wheel 20, and an acceleration sensor 22, all of which provide a sensor input signal to a controller 24. The restraint devices associated with driver seat 12 include a safety belt 26, a multi-level energy absorbing seat belt retractor 28, a pretensioner or belt tightener 30, and an airbag module 32 mounted in steering wheel 20. Airbag module 32 includes an airbag 34, a single rate or variable rate inflator 36 and an optional variable venting valve 38.

Controller 24 sends output signals to control activation of each of these restraint devices based on the sensor input signals. For the sake of brevity, the components associated with passenger seat 14 which are generally similar in function to those described for driver seat 12 are commonly designated by primed reference numerals. As seen, airbag module 32' is mounted in dashboard 40. The above system components and their mode of operation are generally well known and need not be disclosed in exacting detail. The energy absorbing retractor 26 subsequent to being locked by its vehicle or web inertial sensors will permit the safety belt to protract allowing the occupant to move forwardly in a controlled manner. The pretensioner or belt tightener 30, either associated with a seat buckle or with a retractor, eliminates any slack in the safety belt within milliseconds of sensing a crash. The inflator 36 generates inflation gas to inflate the airbag 34. The rate at which the airbag is inflated can be varied by venting a portion of the inflation gas through the variable venting valve 38. Further, if the inflator 36 is a variable rate inflator the controller 24 will generate one or more control signals to produce inflation gasses at a level and within a predetermined time period to inflate the airbag at one or more rates of inflation. The rate of inflation can be varied in proportion to the severity of the crash, the size and or weight of the occupant, and the position of the occupant relative to the installation location of the airbag(s). Further, the activation of the airbag can be eliminated upon sensing that an occupant is not in the seat or if, for example, the seat is only occupied by an inanimate object.

Figure 2:
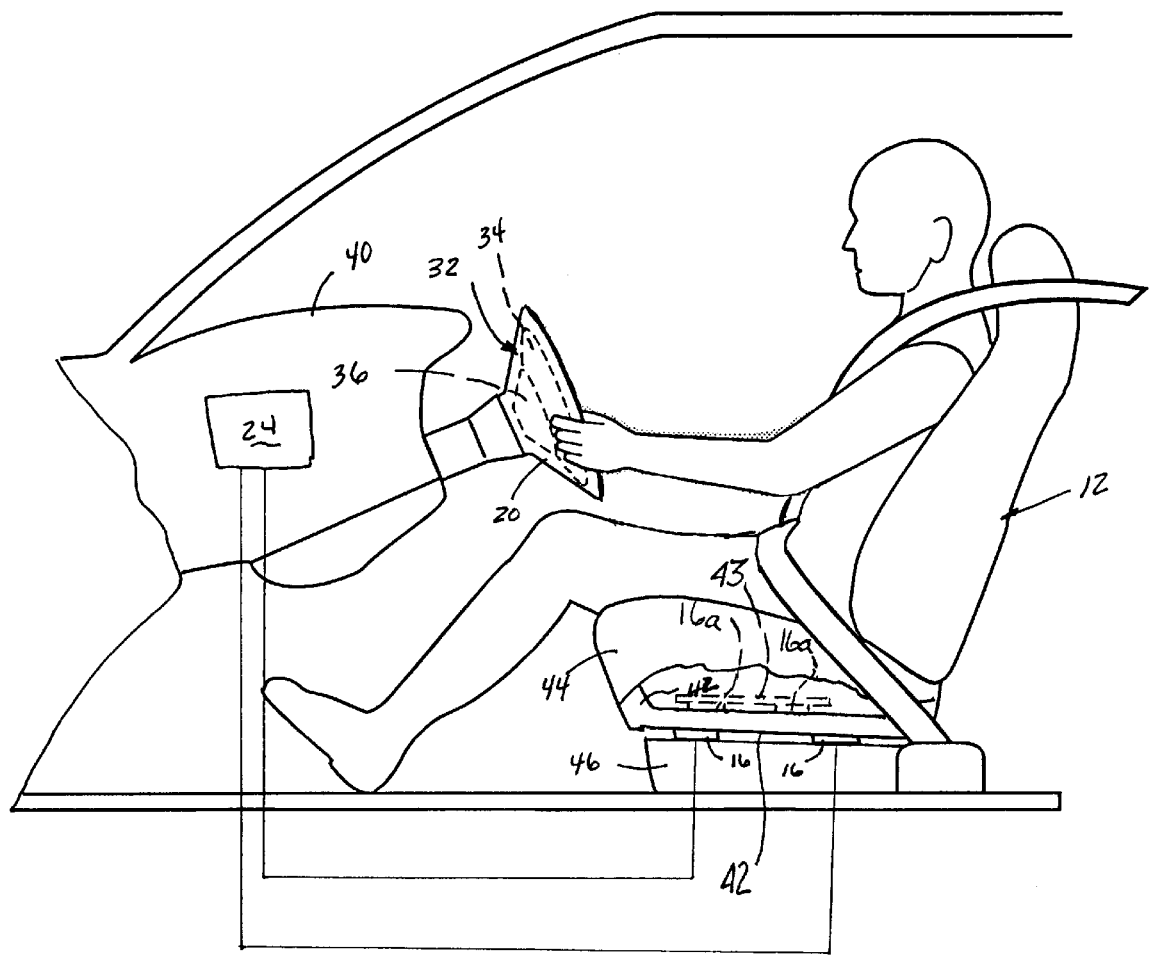
FIG. 2 is a side environmental view illustrating the location of the optical weight sensors in relation to the vehicle seat.

Referring now to FIG. 2, optical weight sensors 16 are shown mounted in driver seat 12 at a location which is subject to the weight of the occupant or object located in the seat. One such weight sensor location is between a seat pan 42 of a seat cushion 44 and a mounting structure 46 which may include a slide device for permitting fore/aft adjustment. Seat pan 42 is a frame component of seat cushion 44 while mounting structure 46 is secured to the vehicle's floor pan. FIG. 2 also illustrates a second exemplary sensor location in which the weight sensors 16a are sandwiched between the seat pan 42 and a secondary plate 43 which is located within cushion 44 below the typically used foam layer. When an occupant sits in seat 12, his/her weight is transferred from cushion 44 and plate 43 or seat pan 42 through optical weight sensors 16 and into mounting structure 46. As such, the algebraic sum of the weight distributed through each optical weight sensor 16 equals the total weight of the seat occupant. While two optical weight sensors 16 are shown, it is contemplated that any number of such sensors can be used as is dictated by each particular vehicular seat application. For example, a single optical weight sensor 16 could be centrally positioned relative to the seat pan 42 or, alternatively, a group of four weight sensors 16 could be arranged at the corners of seat pan 42. Finally, the position of optical weight sensors 16 within driver seat 12 (or passenger seat 14) can be varied as long as the occupant's weight is transferred therethrough.

Figure 3:
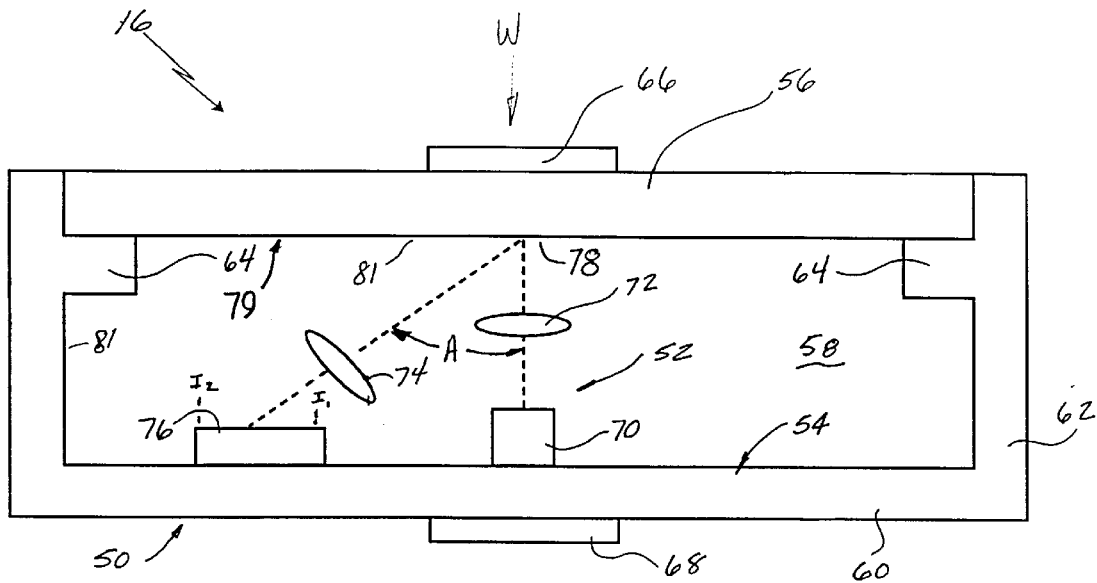
FIG. 3 is a sectional view of the optical weight sensor in an unloaded condition.
Figure 4:
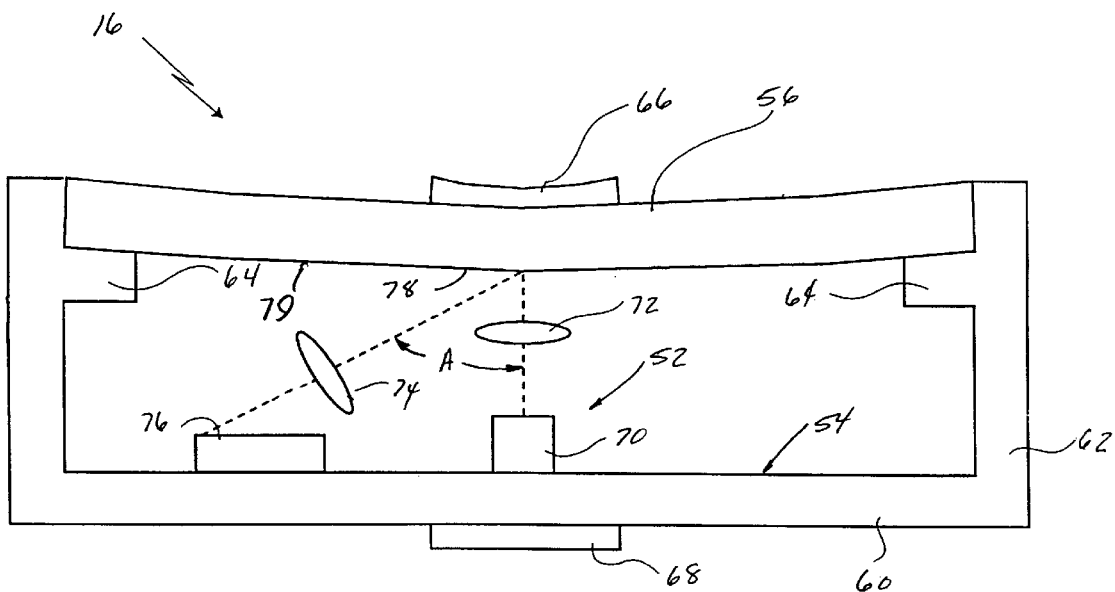
FIG. 4 is a sectional view showing the optical weight sensor in a loaded condition.

Referring now to FIGS. 3 and 4, a first embodiment of optical weight sensor 16 is shown. In general, optical weight sensor 16 includes a housing assembly 50 and an optical imaging assembly 52 retained within housing assembly 50. Housing assembly 50 includes a drum 54 and a deformable cover plate 56 appropriately sealed to the drum. Drum 54 has a chamber 58 defined between a bottom plate segment 60 and a continuous side wall segment 62. A mounting flange 64 extends transversely from side wall segment 62 to provide a surface against which cover plate 56 is secured. Flange 64 could be continuous or formed from a series of isolated lugs. With cover plate 56 secured to drum 54, chamber 58 is completely enclosed to create a dark environment which is desirable for reducing optical noise conditions during operation of imaging assembly 52. Housing assembly 50 could be square, rectangular, cylindrical, or any other shape. An upper mounting flange 66 is fixed to cover plate 56 for mounting to seat pan 42 or plate 43 and a lower mounting flange 68 is fixed to bottom plate segment 60 of drum 54 for mounting to mounting structure 46 or seat pan 42.

Optical imaging assembly 52 is shown in FIGS. 3 and 4 retained within chamber 58 of drum 54 and includes a light emitting unit 70, an optional first imaging lens 72, a second imaging lens 74, and a position sensing unit 76. One such known position sensing unit 76 might comprise an array of light sensitive diodes which provide an output signal depending upon the received locating of reflected or focused light. Light emitting unit 70 and position sensing unit 76 are mounted to bottom plate segment 60 of drum 54. In addition, first imaging lens 72, if used, is mounted in a predetermined spatial relationship between light emitting unit 70 and a target area 78 defined by a small region on the underside or target surface 79 of cover plate 56 proximate the location of the impinging light beam. Similarly, second imaging lens 74 is mounted in a predetermined spatial relationship between target area 78 and position sensing unit 76. In operation, optical triangulation is used to measure the vertical displacement of cover plate 56 relative to bottom plate segment 60 of drum 54 caused by the weight, W, of the seat occupant. Specifically, light emitting unit 70 is supplied with electrical energy from controller 24 for generating a beam of light onto the target area 78 to provide an illuminated light pattern. As the spacing between the target area 78 and the bottom plate segment 60 is small and the environment within the sensor is controlled the light emitting unit 70 should be capable of generating the desired illuminated pattern. If this is not the case, the first imaging lens 72 can be used to focus the light output from the light emitting unit into a beam of desired size and project same onto target area 78. The illuminated light pattern on the target area 78 is sensed and is focused by second imaging lens 74 onto position sensing unit 76. Thus, first imaging lens 72 and second imaging lens 74 are selected to have optical characteristics for properly focusing the beam of light onto target area 78 and position sensing unit 76, respectively. To reduce optical noise, all of the interior surfaces of the sensor with the exception of the target area can be coated with a material 81 which will absorb light at the frequency generated by the light emitting unit. To strengthen its reflectivity characteristics, target area 78 can be polished, covered with a reflective white material or, alternatively, can include a mirror or mirrored layer which is mounted to cover plate 56.

The position sensing unit 76 is a transducer which generates an electrical output signal having a magnitude which is proportional to the position or size of the light incident thereon. Vertical displacement of target area 78, due to resilient deflection of cover plate 56 causes a corresponding change in the reflection angle "A", as measured by the change in position at which the focused light pattern or reflected incident light beam strikes the position sensing unit 76. Since the amount of displacement of target area 78 can be correlated to the amount of deflection of cover plate 56, the output signal from position sensing unit 76 can be correlated, upon calibration, by a conversion factor(s) to determine the occupant's weight. To facilitate deflection of cover plate 56 between the "unloaded" position of FIG. 3 and the exemplary "loaded" position of FIG. 4, cover plate 56 is made of a material, such as aluminum (or rubber or plastic faced with a reflective surface), having the capacity to be resiliently deflected (and returning to an unstressed condition when the weight is removed) for permitting weight determination through an anticipated weight range for the seat occupants. Preferably, position sensing unit 76 has two electrical current outputs, $I_1$ and $I_2$, located at its opposite ends such that output voltage signal, which is proportional to the position of the incident light or size and position of the imaged light pattern on positioning sensing unit 76, can be delivered to controller 24.

Figure 5:
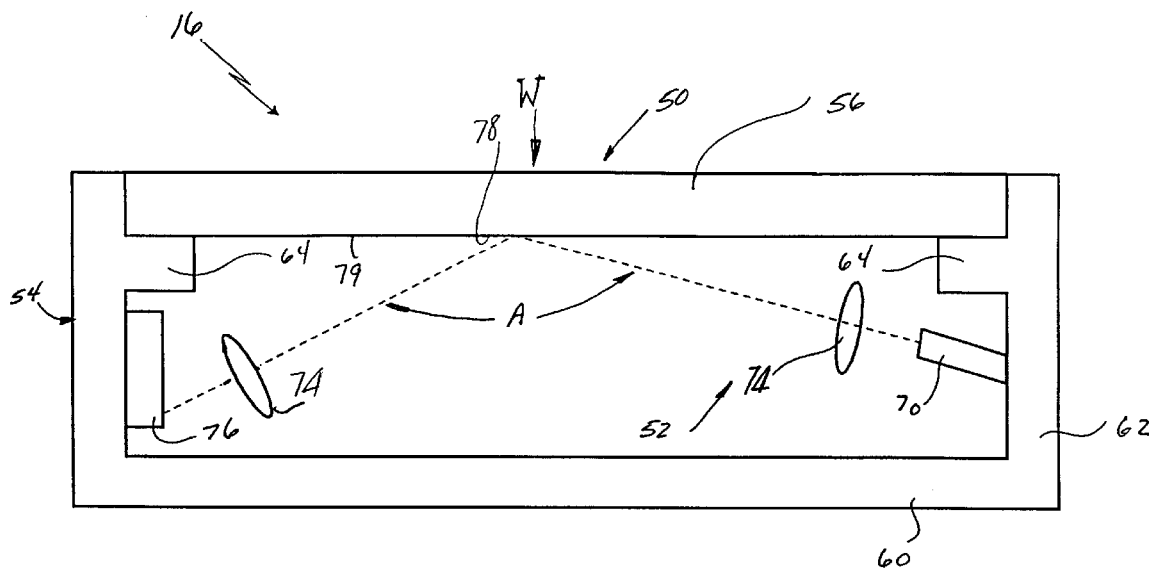
FIG. 5 is a sectional view of an alternative embodiment of the optical weight sensor.

Referring now to FIG. 5, an alternative embodiment for optical weight sensor 16 is shown. In particular, a modified arrangement for imaging assembly 52 is shown within housing assembly 50 with light emitting unit 70 and position sensing unit 76 secured to opposite side wall segments 62 of drum 54. In this embodiment, the triangulation between light emitting unit 70, target area 78, and position sensing unit 76 is maximized such that small displacements of target area 78 will result in larger changes in the reflected angle "A". As a result, the greater range of displacement values along position sensing unit 76 will improve (i.e., provide finer resolution) measurement accuracy for the occupant's weight. Additionally, a larger reflection angle "A" results in a less divergent and stronger reflected beam of light.

Figure 7:
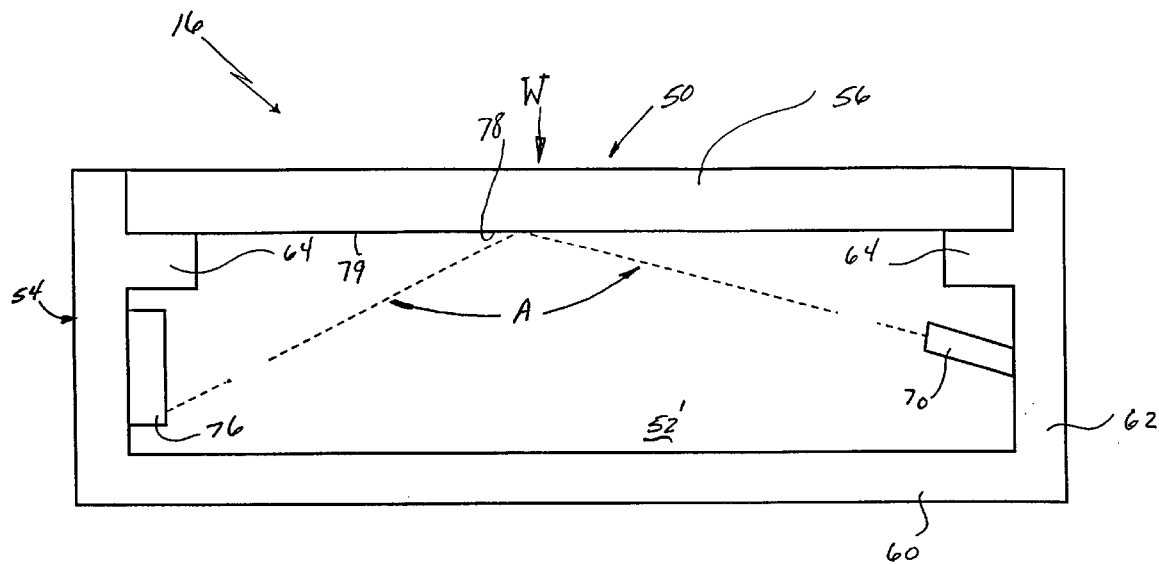
FIGS. 6 and 7 illustrate alternate embodiments of the invention.
Figure 6:
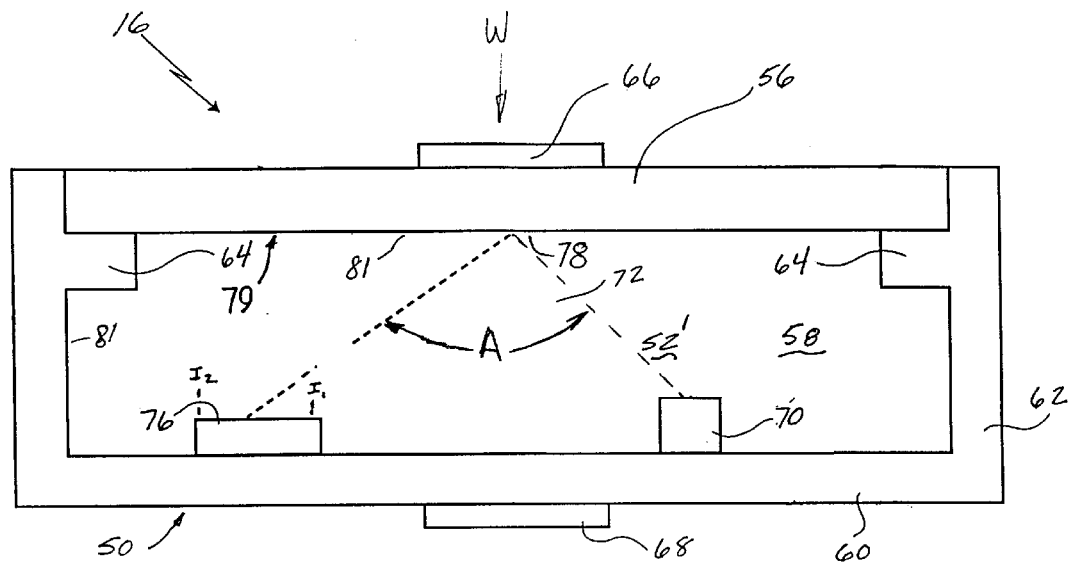

Reference is briefly made to FIGS. 6 and 7 which illustrate various alternate embodiments of the invention. The construction of the weight sensor 16 shown in FIGS. 6 and 7 is rather similar to the construction shown in FIGS. 1 and 5. In these alternate embodiments the imaging assembly 52 of each weight sensor 16 (or 16') has been replaced with a light reflecting assembly 52'. The first and second imaging lenses 72 and 74 have been eliminated and the light emitting unit 70 is now displaced at an angle relative to the target area 78. The light emitting unit generates a thin beam of light upon the targeting surface which is reflected by the target area to the position sensing unit 76. The electrical output of the position sensing unit 76 will vary with the deflection of the cover plate 56 as a measure of the weight of the object or occupant in the seat.

The present invention being thus described, it will be obvious to those skilled in the art that the invention may be varied in many ways. Accordingly, such variations are not to be regarded as a departure from the spirit and scope of the invention, and all such modifications are intended to be included within the scope of the following claims.

We claim:

1. A safety restraint system for restraining an occupant seated in a seat, comprising:
    a restraint device (32) which can be selectively activated to restrain the occupant;
    a weight sensor (16) for determining the weight of the occupant and generating an output signal indicative thereof, the weight sensor (16) including a housing (50) secured to the seat and an optical assembly (52) retained in the housing (50) for generating the output signal as a function of the amount of displacement of the housing (50) relative to the optical assembly (52) caused by the occupant's weight; and
    a controller (24) for controlling activation of the restraint device (32) in response to the output signal.

2. The safety restraint system of claim 1 wherein the housing (50) defines a chamber (58) having a first wall segment (60) and a second wall segment (56), and wherein the optical assembly (52, 52') includes a light emitting unit (70) secured to the first wall segment (60) which emits a light beam at a target area (78) on the second wall segment (56), and a position sensing unit (76) secured to the first wall segment (60) which receives the light beam reflected off the target surface (78), whereby deflection of the second wall segment (56) caused by the weight of the occupant being applied to the housing (50) causes a corresponding change in the position of the target area (78) such that the reflected light beam strikes the position sensing unit (76) at different positions corresponding to the weight of the occupant.

3. The safety restraint system of claim 2 wherein the optical assembly (52) further comprises a first lens (74) located between the target surface (78) and the position sensing unit (76).

4. The safety restraint system of claim 3 wherein the optically assembly (52) additionally comprises a second lens (72) located between the light emitting unit (70).

5. The safety restraint system of claim 2 wherein the housing (50) includes a drum (54) enclosed by a cover plate (56), and wherein the first wall segment is a bottom wall segment (60) of the drum (54) and the second wall segment is the cover plate (56) which is located above bottom wall segment (60).

6. The safety restraint system of claim 2 wherein the housing (50) includes a drum (54) enclosed by a cover plate (56), and wherein the first wall segment is a side wall segment (62) of the drum (54) and the second wall segment is the cover plate (56) positioned transversely with respect to side wall segment (62).

7. The safety restraint system of claim 1 wherein the housing (50) of weight sensor (16) is mounted between one of a frame member (42) of the seat and a mounting structure (46) and the frame member (42) and a plate (43) located within the seat.

8. A weight sensor for determining the weight of an occupant sitting in a seat, comprising:
    a housing (50) secured relative to the seat and which includes a plate (56) adapted to deflect in response to the occupant's weight being transferred to the housing (50); and
    an optical assembly (52) mounted to the housing (50) and including a light emitting unit (70) which emits a light beam directed at a target area (78) on the plate (56), and a position sensing unit (76) receiving the incident light beam reflected off the target surface (78), whereby deflection of the plate (56) causes the incident light beam to strike the position sensing unit (76) at different positions corresponding to the weight of the occupant.

9. The weight sensor of claim 8 wherein the housing includes a drum (54) and the plate is a cover plate (56) enclosing the drum (54) to define an enclosed chamber (58), and wherein the light emitting unit (70) and the position sensing unit (76) are mounted on a common surface of the drum (54).

10. The weight sensor of claim 8 wherein the optical assembly (52) further comprises a first lens (72) located between the light emitting unit (70) and the target surface (78), and a second lens (74) located between the target area (78) and the position sensing unit (76).

11. The weight sensor of claim 8 wherein the position sensing unit (76) generates an output signal that is proportional to the position of the incident light beam.

12. A method of measuring the weight of an object using an optical weight sensor, the method comprising the steps of:
    projecting a beam of light toward a target area;
    displacing the target area due to the weight of the object;
    measuring the displacement of the target area by determining the reflection angle of the beam of light reflected off the target area;
    generating an output signal in proportion to the measured displacement of the target area and which is indicative of the weight of the object.

13. The method of claim 12 further comprising the step of focusing the beam of light projected toward the target area.

* * * * *